United States Patent [19]

Shiba et al.

[11] Patent Number: 5,524,805
[45] Date of Patent: Jun. 11, 1996

[54] WEB FEED ROLLER AND DRIVE CONTROL SYSTEM THEREOF

[75] Inventors: Noriyuki Shiba, Tokyo; Masayoshi Sato, Kawasaki, both of Japan

[73] Assignee: Kabushikigaisha Tokyo Kikai Seisakusho, Tokyo, Japan

[21] Appl. No.: 996,874

[22] Filed: Dec. 28, 1992

Related U.S. Application Data

[63] Continuation of Ser. No. 649,275, Jan. 30, 1991, abandoned, which is a continuation of Ser. No. 363,767, Jun. 9, 1989, abandoned.

[30] Foreign Application Priority Data

Jun. 14, 1988 [JP] Japan ................................. 63-146035
Jun. 29, 1988 [JP] Japan ................................. 63-161779

[51] Int. Cl.$^6$ ................................................. B41F 13/02
[52] U.S. Cl. ........................ 226/108; 101/425; 226/188
[58] Field of Search ............................ 226/188, 45, 24, 226/27–31, 108, 111, 112; 101/228, 248, 423, 425; 242/75.5, 75.47, 75.51

[56] References Cited

U.S. PATENT DOCUMENTS

| | | | |
|---|---|---|---|
| 1,994,404 | 3/1935 | Reiners et al. | 242/18 DD |
| 2,224,128 | 12/1940 | Abbott | 242/35.5 R |
| 3,469,751 | 9/1969 | Tynner et al. | 226/188 X |
| 3,490,672 | 1/1970 | Fisher et al. | 226/188 |
| 3,678,313 | 7/1972 | Parker | 226/188 X |
| 3,749,429 | 7/1973 | Nedreski | 242/75.47 X |
| 3,806,012 | 4/1974 | Roch | 226/28 X |
| 3,949,949 | 4/1976 | Thompson | 226/30 X |
| 4,095,732 | 6/1978 | Merritt | 226/43 X |
| 4,429,822 | 2/1984 | Dyck | 226/61 |
| 4,484,522 | 11/1984 | Simeth | 226/28 |
| 4,527,788 | 7/1985 | Masuda | 101/248 X |
| 4,552,066 | 11/1985 | Giori et al. | 101/248 X |
| 4,648,540 | 3/1987 | Steidel | 226/111 |
| 4,781,115 | 11/1988 | Ueda et al. | 101/425 |
| 4,781,116 | 11/1988 | Harada | 101/425 |
| 4,805,111 | 2/1989 | Steidel | 226/111 X |
| 4,838,498 | 6/1989 | Huth | 242/75.51 |
| 4,848,630 | 7/1989 | Niestrath et al. | 226/111 X |
| 4,896,605 | 1/1990 | Schröder | 226/28 X |
| 4,898,094 | 2/1990 | Doumoto et al. | 101/248 X |
| 4,930,415 | 6/1990 | Hara et al. | 226/188 X |

FOREIGN PATENT DOCUMENTS 62-149449  3/1987  Japan.

OTHER PUBLICATIONS

"Printing Dictionary"–Supplement Edition published and edited by Japan Printing Academy Corporation; the first edition on Jun. 30, 1987; p. 74, item Guide Roller and item Guide Roller Contamination (Guide Roller Spoiling).
"Newspaper Printing" Printing Art—Reversed Edition FIG. 57 on p. 48 published Oct. 31, 1980.
Japanese Patent Publication No. 58-30217 published Jun. 28, 1983.
Japanese Utility Model Publication No. 56-4695 published Feb. 2, 1981.
Japanese Patent Laid-Open Publication No. 52-136010 published Nov. 14, 1977.

*Primary Examiner*—Daniel P. Stodola
*Attorney, Agent, or Firm*—Foley & Lardner

[57] ABSTRACT

A web feed roller is driven by a compact and simple web feed roller drive device included in the web feed roller. The web feed roller comprises a support shaft, a cylindrical hollow member rotatably supported on the support shaft, a stator provided with an electrically conductive member and fixed on the support shaft, a rotor fixed on the cylindrical hollow member to face with the stator, and an electrical connecting member connected to the conductive member of the stator. The web feed roller is electrically connected to a drive control system comprising a speed control device to control driving speed of the web feed roller, and a signal generating device for outputting a speed signal representing an actual speed of the web feed roller into the speed control device.

4 Claims, 4 Drawing Sheets

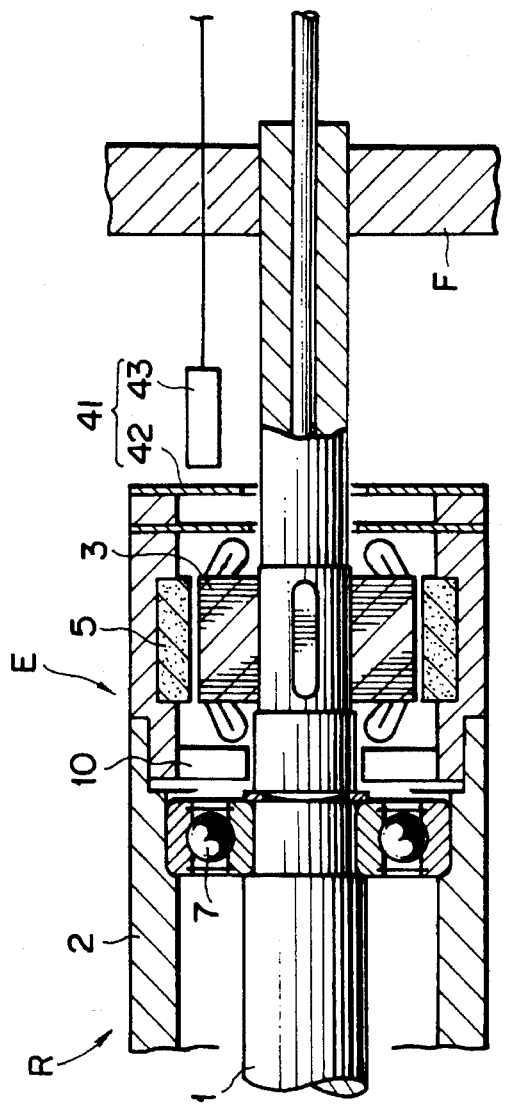
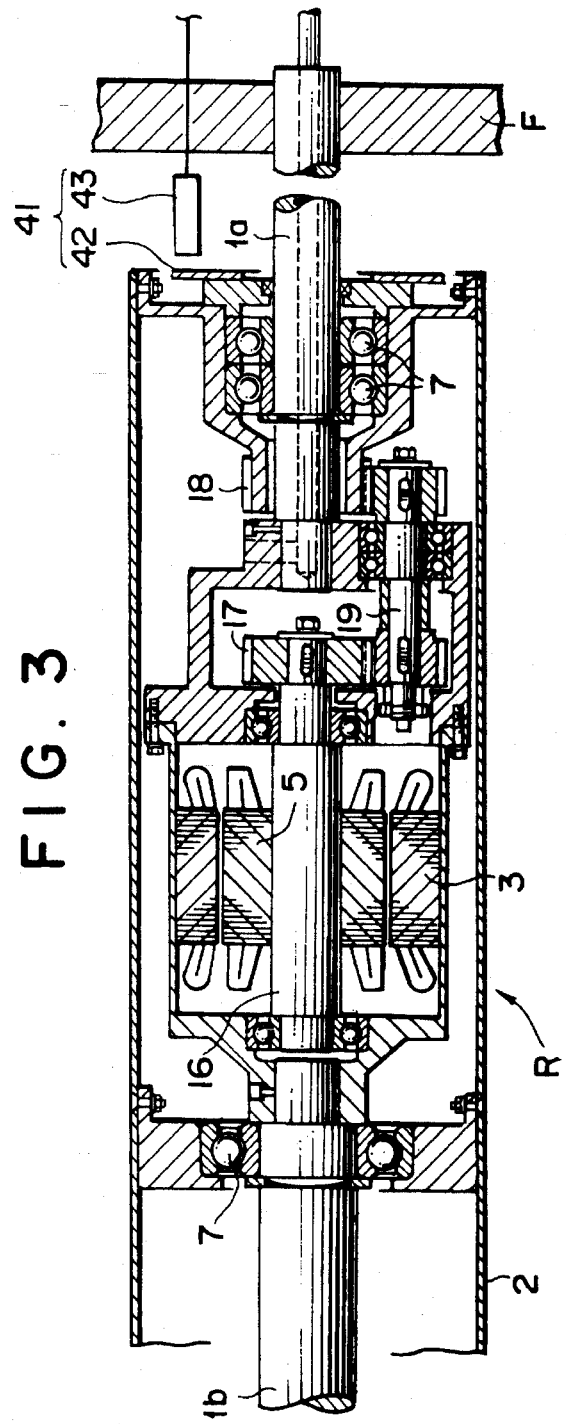
FIG. 2
FIG. 3

WEB FEED ROLLER AND DRIVE CONTROL SYSTEM THEREOF

This application is a continuation of application Ser. No. 07/649,275, filed Jan. 30, 1991 now abandoned, which is a continuation of a prior application Ser. No. 07/363,767, filed on Jun. 9, 1989 now abandoned.

BACKGROUND OF THE INVENTION

1. Field of the Invention

The present invention relates to a feed roller for feeding and guiding a paper, fabric or cloth web from an intake portion to a working portion. More particularly, the present invention relates to a web feed roller adapted for a rotary press in which a rolled paper web is moved at high speed from a paper reservoir section to a folding section through a printing section and the web feed roller is driven in the same direction of the web travelling direction. Furthermore, the present invention relates to a drive control system associated with the above defined web feed roller.

2. Description of the Prior Art

In recent years, printing systems, especially those used in a newspaper printing company, have required a compact and high speed rotary press which can perform printing work at a high speed and can provide much printed material within a limited space. Furthermore, newspapers include much information and thus have often expanded and enriched their pages and color printing sections. This requires complicated printing systems. For example, printing works have been increased for each page, and paper web guiding processes have been complicated and may be varied in many ways. According to these complicated printing systems, the web travelling distance has been extended to require many guide rollers. Under this condition, if the rotary press is driven at an extremely high speed, the paper web will suffer a high tension load.

On the other hand, the paper web required has been gradually changed to be thin and light for satisfying the need that winding length of each rolled web should be extended for low cost performance and compact size; that the interval of connecting section between two rolled webs be extended as much as possible to reduce paper loss and the non-working period of printing system, and that the whole thickness of newspaper should be thin regardless of increment of pages.

The high speed rotary press and such thin and light paper web also requires changes to ink characteristics. If conventional ink is used in this high speed rotary press, the printed ink will not be completely dried. Thus, wet-ink will adhere on the surface of the feed or guide roller for feeding or guiding the printed web. Furthermore, paper dust will be also deposited on the ink adhered to the surface. The adhered ink and deposited paper dust will spoil the printed surface and provide travelling stress to the paper web. This travelling stress will sometimes cause tearing of the paper web (refer to "Supplement Edition Printing Dictionary" published and edited by Japan Printing Academy Corporation; the first edition on Jun. 30, 1987; page 74, item "Guide Roller Spoiling").

Therefore, such conditions require a decrease in the tension load applied to the paper web travelling through the rotary press. In other words, many guide rollers, or all guide rollers in the rotary press, as required, should be driven to control the tension load applied to the travelling paper web.

Conventionally, the guide rollers in the rotary press are not connected to drive means as disclosed in "Guide Roller" on page 74 of "Supplement Edition Printing Dictionary". However, if the rotary press is driven at a high speed, such non-driven guide rollers will cause problems. For example, the paper web travelling in front of the paper feed roller will be bent or loosened; or the travelling speed of the paper web will directly depend on printing speed or inertial force of the guide roller.

A drag roller, a driven roller arranged on a guide way for the paper web travelling through the rotary press, is well known. Such a drag roller is driven at a slightly faster speed than a printing plate cylinder to always apply tension on the paper web, as referred to in the disclosure on page 61, line 23 to 27 in right column of "News Paper Printing; Printing Art, Reversed Edition" published on Oct. 31, 1980 by Nippon News Paper Association Corporation. This drag roller is driven by a main power source of the rotary press through a lot of gears as shown in FIG. 57 on page 48 of "News Paper Printing; Printing Art, Reversed Edition".

In addition to the above problems, a printing system has been enlarged by connecting many rotary presses and driven at a high speed. This enlarged printing system will also cause to an increase in the tension load applied to the paper web travelling along the guide way of this printing system. Thus, this tension load will sometimes generate defects in product quality and make working efficiency poor. To overcome these defects, some driven rollers in addition to the drag roller have been arranged on the guide way as disclosed in Japanese Patent Laid-Open Publication No. 51-137508 (Japanese Patent Publication No. 58-30217) entitled "Tension Control Device for Running Paper in Rotary Press" Japanese Utility Model Laid-Open Publication No. 53-13802 (Japanese Utility Model Publication No. 56-4595) entitled "Tension Adjusting Device for Paper Running along Paper Feed Way in Rotary Press", and Japanese Patent Laid-Open publication No. 52-136010 entitled "Tension Control Device in Rotary Press".

In these references, the driven roller arranged on the paper guide way includes a roller shaft rotatably supported on a frame of rotary press, and a gear drive means secured on one end of the roller shaft. The gear drive means is mechanically connected to a driving source isolated from the driven roller. However, this driving system requires an additional driving unit for driving and control of the driven roller. Thus this driving system is more complicated and larger in scale and requires a relatively wide space for positioning. Accordingly, the driven roller can not be positioned in an area where many elements or parts are gathered such as, for example, the inlet portion of folding section where many guide rollers are closely arranged. Furthermore, this complicated and large scale system requires hard work and considerable cost to assemble and maintain. Also, such a complicated and large scale driving system causes loss in driving efficiency.

BRIEF SUMMARY OF THE INVENTION

It is therefore an object of the present invention to provide a web feed roller with an extremely compact and simple structure.

Another object of the present invention is to provide a web feed roller which can be easily set at the position where non-driven rollers have been conventionally set to constitute a web guide way.

A further object of the present invention is to provide a web feed roller which does not require a complicated and large sized driving system connecting the web feed roller and the driving power source to improve driving efficiency.

A still further object of the present invention is to provide a web feed roller which can be finely controlled by a simple means to feed a paper web at a high speed.

Yet another object of the present invention is to provide a drive control system associated with the web feed roller.

To accomplish these objects the web feed roller according to the present invention comprises a support shaft, a cylindrical hollow member rotatably supported on the support shaft, a stator provided with an electrically conductive member and fixed on the support shaft, a rotor fixed on the cylindrical hollow member to face with the stator, and an electrical connecting member connected to the conductive member of stator.

According to another aspect of the present invention, a drive control system for the web feed roller comprises a speed control means to control driving speed of the web feed roller, and a signal generating means for outputting a speed signal representing an actual speed of the web feed roller into the speed control means.

Other objects and advantages of the present invention will become apparent during the following discussion of the accompanying drawings.

BRIEF DESCRIPTION OF THE DRAWINGS

FIG. 2 is partially enlarged sectional view of the web feed roller shown in FIG. 1;

FIG. 3 is partially enlarged sectional view of the web feed roller according to a second embodiment of the present invenion;

DETAILED DESCRIPTION OF THE PREFERRED EMBODIMENT

Figure 7:
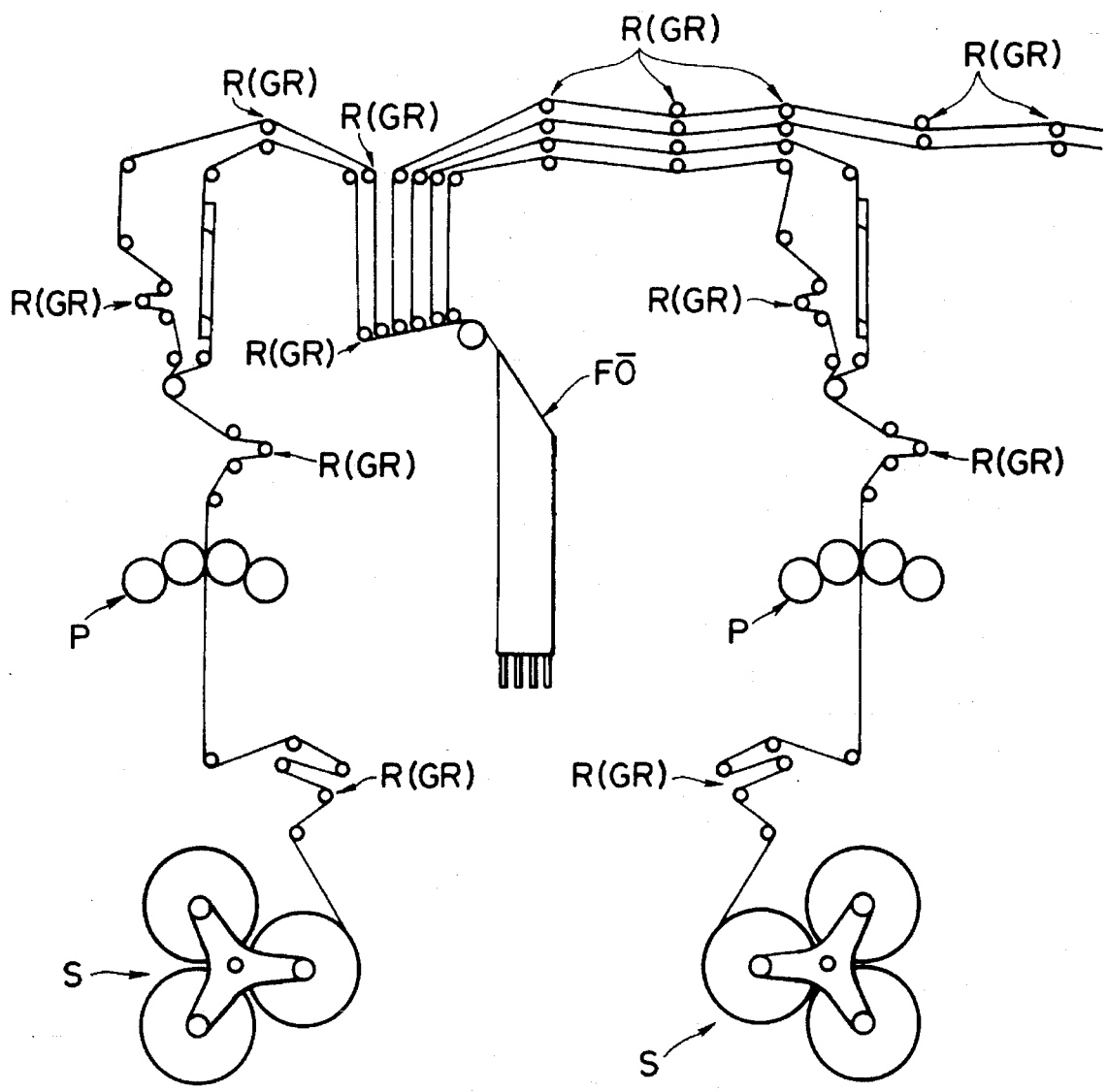
FIG. 7 is a schematic illustration showing a printing system employing the web feed roller according to the present invention.

In order to facilitate for understanding the present invention, a paper web, represented by a solid line, is travelling in a rotary press printing system of the type as shown in FIG. 7. This printing system is essentially composed of a pair of paper storing units S, a pair of printing units P, a plurality of guide rollers GR (web feed roller R), and a folding unit FO. The guide rollers GR (web feed roller R) are arranged to support the paper web travelling from the paper storing unit S to the folding unit FO via the printing unit P and to change its travelling direction so that the paper web can be guided without loosening. The web feed roller according to the present invention can be applied to any postions of the guide rollers GR shown in FIG. 7.

A first preferred embodiment of the web feed roller and its drive control system according to the present invention will be described in conjunction with FIG. 1 and FIG. 2.

Figure 1:
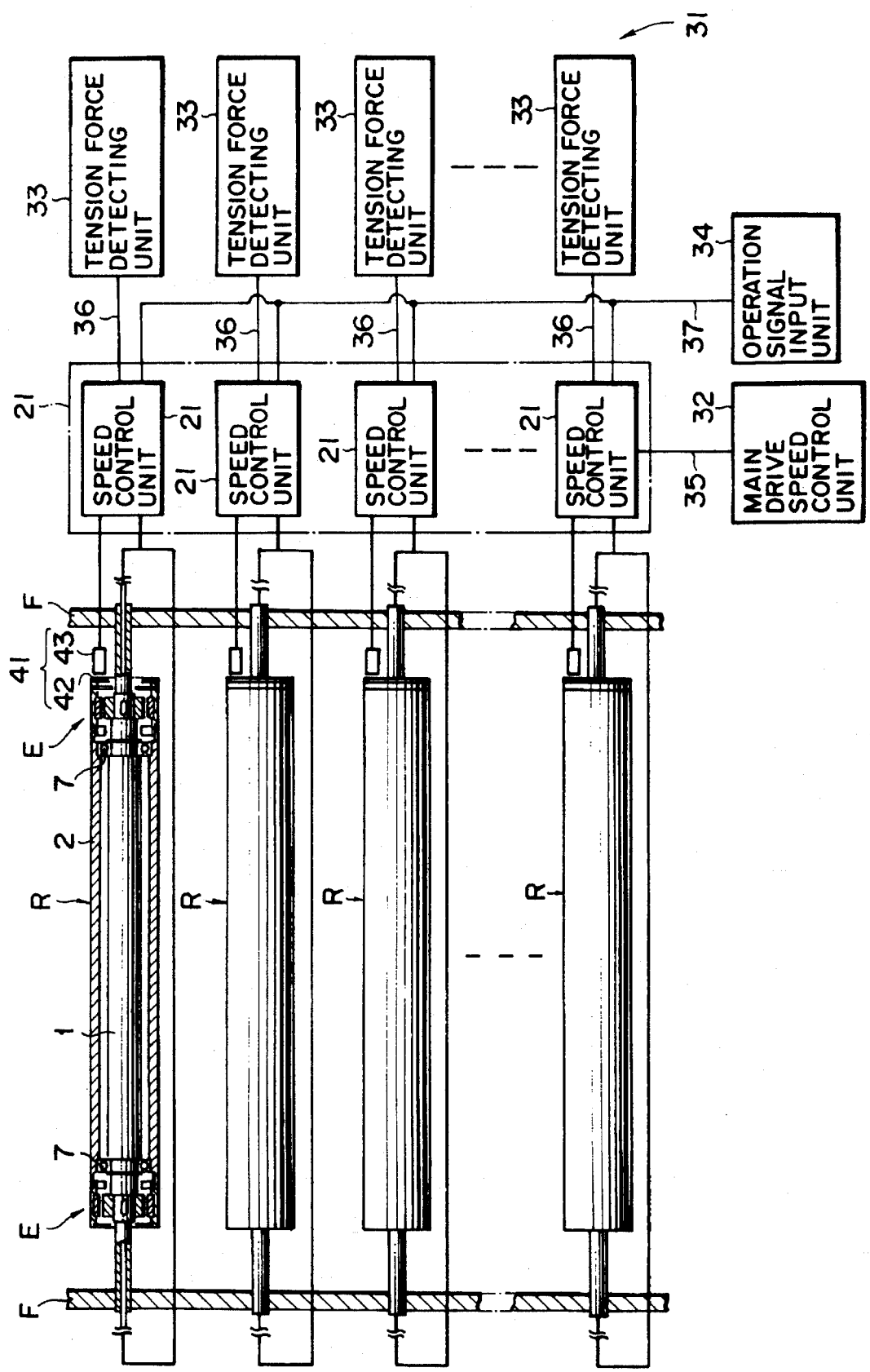
FIG. 1 is a schematic illustration showing the web feed roller and its drive control system according to a first embodiment of the present invention.

Referring to FIG. 1, the reference symbols F and R denote a frame of this printing apparatus or rotary press and a web feed roller, respectively. A support shaft 1 extends between the frames F, F and is fixed thereon. On the support shaft 1, a cylindrical hollow member 2 is rotatably supported through a bearing member 7 at the vicinity of each end of the cylindrical hollow member 2. Adjacent to the bearing member 7, a rotor 5 is fixed on the inside wall of the cylindrical hollow member 2 as shown in FIG. 2. Facing the rotor 5, a stator 3 is fixed on the support shaft 1. Together the rotor and stator constitute a motor E in which the cylindrical hollow member 2 is rotated. Rotating speed of the motor E is controlled by a speed control unit 21. An inverter is employed in this embodiment as the speed control unit 21. The speed control unit 21 is connected to a control signal generating unit which generates and outputs a control signal 35 for the speed control unit 21.

The control signal generating unit may comprise a main drive speed control unit 32 which is used for controlling the rotary press, a plurality of tension force detecting units 33 which are used for detecting the tension applied to the paper web travelling, dirt detecting means 38 for detecting dirt on the circumferential surface of a drive roller This dirt typically comprises ink and paper dust adhering to the drive roller. The generating unit may also comprise an operation signal input unit 34 through which an operation signal is input by manual operation. The signal generating unit may be composed of a single unit or combination of units as shown in FIG. 1.

The web feed roller R further includes a speed detecting means 41 connected to the speed control unit 21 and which sends the rotating speed of the roller R into the control unit 21 as a feedback information. The speed detecting means 41 is composed of the sensed element 42 and a sensing element 43. Generally, the sensed element 42 is fixed on the cylindrical hollow member 2 so that the sensed element 42 can be rotated with the cylindrical hollow member 2. The sensing element 43 is arranged to face the sensed element 42. Of course, the speed detecting means 41 is not limited to only this composition, but can also use any conventional rotating speed detecting devices capable of detecting the rotating speed of the web feed roller R.

The motor E further includes a cooling fan 10 which is interposed between the bearing member 7 and the stator 3. The cooling fan 10 is fixed on the cylindrical hollow member 2 and extends radially towards support shaft 1 so that it will generate cooling wind as the cylinderical hollow member 2 is rotated.

FIG. 3 shows a second embodiment of web feed roller. In this drawing, the same reference numerals denote the same or corresponding elements of the first embodiment, therefore the same explanation as set forth above will not be repeated.

A symbol E' denotes a motor used as a drive unit for the web feed roller. The motor E' is suspendingly disposed in a cylindrical hollow member 2' through an end shaft 1a fixed on a frame F and an intermediate shaft 1b. The motor E' includes a rotatable shaft 16 whose end is fixedly provided with an output gear 17. This output gear 17 is mechanically connected to a stationary gear 18 fixed on the cylindrical hollow member 2' via a transmission gear unit 19. The rotating force generated by the motor E' is transmitted to the cylindrical hollow member 2' through the gear connection.

The motor, either E, or E' may be arranged in only one web feed roller or in many feed rollers as shown in FIG. 1 so that web can be fed by required feed force. If the motor E' is arranged in only one, the intermediate shaft 1b shown in FIG. 3 may be extended leftwardly to act as the support shaft for the web feed roller R in the same manner as the first embodiment. The bearing member 7 interposed between the support shaft 1 (the end shaft 1a, the intermediate shaft 1b) and the cylindrical hollow member 2 (2') is not limited to the position shown in FIG. 2 and FIG. 3.

Operation of the web feed rollers according to the first and second embodiments will be described as follows.

When the rotary press of the printing unit P is started, the main drive speed control unit 32 of this printing apparatus generates and outputs the control signal 35 to the speed control unit 21. According to the control signal 35, the speed control unit 21 controls the motor E (E') so as to coincide the rotating speed of the web feed roller R with the required value in response to the main drive speed. The cylindrical hollow member 2 (2') of the web feed roller R is rotated to smoothly feed the paper web without applying excess tension force onto the paper web. The control operation of the speed control unit 21 is continued in response to the control signal 35 from the main drive speed control unit 32 except for another control signal output from the tension force detecting unit 33, operation signal input unit 34, or the dirt detecting unit 38.

The control signal from the tension force detecting unit 33 is generated in the following manner. When the tension force applying the paper web between two web feed rollers is markedly changed, for example, because of expansion or contraction of the paper web which has been affected by dampening fluid used in an offset printing system, and the change will in a tension exceeding the maximum or minimum value of the preset allowance of the tension range, each of the tension force detecting units 33 will output a first compensating signal 36 into corresponding speed control unit 21. The speed control unit 21 will compensate by controlling the rotating speed of the web feed roller R to return the tension into the allowance range.

The control signal is generated from the operation signal input unit 34 in the following manner. When the surface of the web feed roller R is spoiled by ink or dust which will possibly cause troubles such as spoils on the printed surface of paper web and extraordinary load on the running paper web, an operator will switch on the operation signal input unit 34 to output a second compensating signal 37 into corresponding speed control unit 21. According to the second compensating signal 37, the speed control unit 21 will change the rotating speed of the web feed roller R to generate slight slipping between the surface of the web feed roller R and the paper web surface. The range for changing the rotating speed of the web feed roller is preferably predetermined to avoid exceeding the allowed range of tension applied to the running paper web.

This control may be performed by a sequential control so that the control signal is sequentially input into respective speed control units 21 in response to the signal input by the operator to automatically and successively change the rotating speed of the series of the web feed rollers R, R, - - - , at a predetermined interval period. Alternately, the same control signal may be sequentially input into respective speed control units 21 concurrently with the starting signal of the rotary press transmitted through any commonly used signal generating means, not shown, to change the rotating speed used signal generating means, not shown, which in turn change the rotating speed of the web feed rollers R at regular intervals. This control is intended to prevent the external surface of the web feed roller R from spoiling with ink and dust.

If dirt detector 38 is arranged to detect any dirt such as ink or dust on the surface of each one of the weed feed rollers, the signal output from the dirt detector may be substituted for the second compensation signal 37 from the operation signal input unit 34. While the speed control unit 21 is working its control operation in response to this detected signal, it is desirable to void the dirt detector 38.

Under operating condition, the speed detecting means 41 always detects the rotating speed of the web feed roller R and outputs the detected signal into the speed control unit 21. Then the speed control unit 21 compares the detected signal with the predetermined speed. If the detected rotating speed is different from the predetermined speed, the speed control unit 21 will compensate so that the actual rotating speed of the web feed roller R coincides with the predetermined value.

Figure 4:
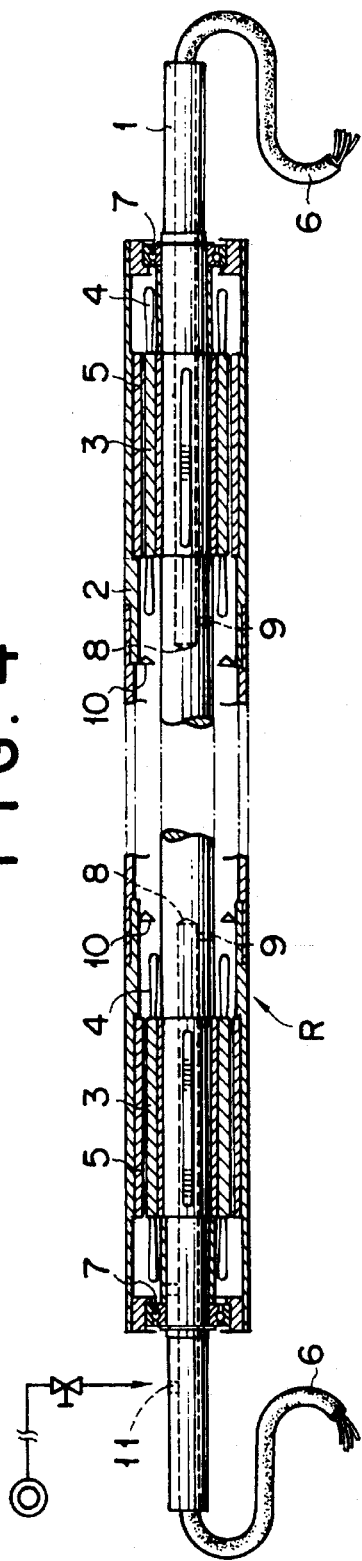
FIG. 4 is a schematically sectional view showing the web feed roller according to a third embodiment of the present invention.

Next, FIG. 4 shows a third embodiment of web feed roller according to the present invention. The same reference numerals denote the same or corresponding elements, so that the same description will not be repeate.

A support shaft 1 for a web feed roller R is properly fixed on frames of a printing apparatus, not shown in this drawing. The support shaft 1 supports a cylindrical hollow member 2 through two bearing members 7, 7 fixed on both ends of the support shaft 1. The support shaft 1 is fixedly provided with a stator 3 with a coil 4 through which electric current can flow. The coil 4 is electrically connected to a lead 6 which is insertingly arranged in a deep hole 8 formed from the end along the axis of the support shaft 1. A rotor 5 with a lead member, not shown, is fixed on the inside wall of the cylindrical hollow member 2 so as to face with the stator 3 through gap therebetween. The lead member is formed in, for example, a cage shape whose both ends are connected through a short-circuit ring.

Although the third embodiment shown in FIG. 4 provides two sets of the stator 3 and the rotor 5 adjacent to the ends of the cylindrical hollow member 2, their position and number are not limited to this arrangement so long as they ensure that the web feed roller can be rotated at a required speed and with a good balance.

The deep hole 8 may be communicated with ambient air through a plurality of orifices 9 formed in the support shaft 1. These orifices 9 are intended to induce cooling air while the device is working. To accelerate cooling effect, a cooling fan 10 may be arranged at any suitable position in the cylindrical hollow member 2 to generate cooling air in accordance with the rotation of the cylindrical hollow member 2, and/or cooling wind may be directly applied to the end sections of the support shaft 1 extended out of the cylindrical hollow member 2.

Operation of the third embodiment will be described.

Alternating current with a proper frequency is applied to the coil 4 through the lead 6 to generate a magnetic field. The rotor 5 is applied with the force in the direction at a right angle to the magnetic flux generated between the coil 4 and the rotor lead member. The rotor 5 is thereby rotated in the direction of the magnetic field at a relatively slow speed. Since the rotor 5 is fixed to the cylindrical hollow member 2, the hollow member 2 is also rotated about the support shaft 1.

Figure 6:
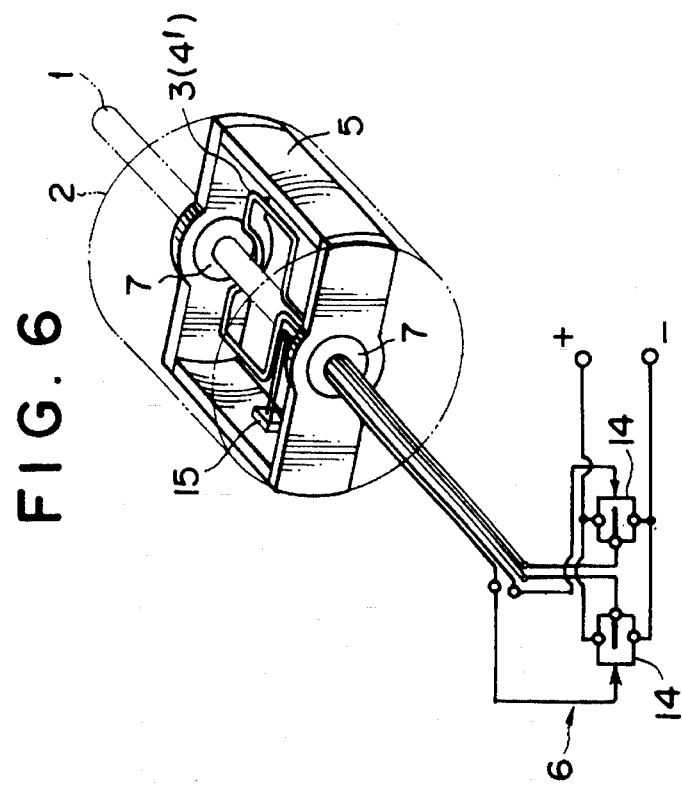
FIG. 5 and FIG. 6 are schematically and simplified illustrations showing a web roller drive unit to explain the relation between a stator and a rotor assembled on a web feed roller.
Figure 5:
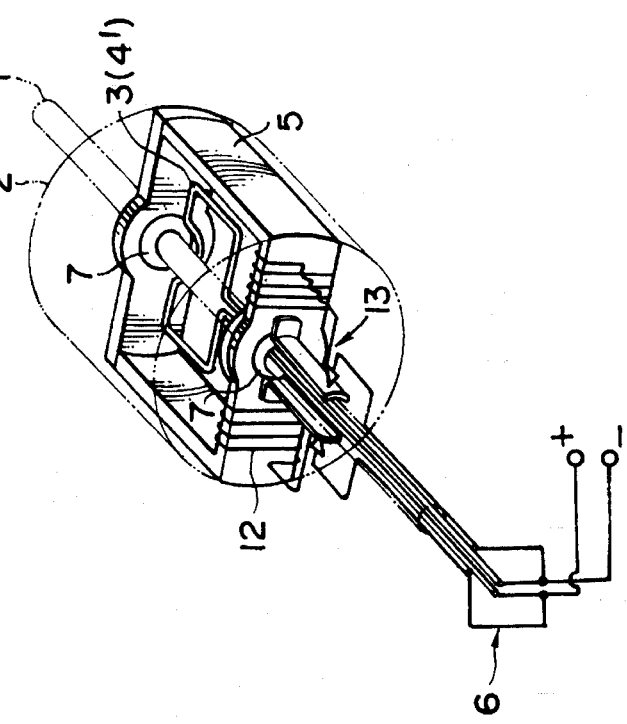

FIG. 5 and FIG. 6 show modifications of the roller drive unit of the third embodiment. These modified roller drive unit are applied with direct current through the lead 6. They have respectively a stator lead member 4' through which direct current flows in the same direction through the lead 6. Since FIG. 5 and FIG. 6 are simplified to facilitate understanding of their structure, the stator lead member 4' corresponds to a stator 3.

In FIG. 5, a rotor 5 is fixed on the inside wall of the cylindrical hollow member 2 to face with the stator 3. The rotor 5 is composed of a multipolar electromagnetic element with a coil shape lead member 12. The lead 6 is further provided with a rectifying means 13 composed of a commutator and a brush. This rectifying means 13 is intended to convert the current direction flowing through the coil shape lead member 12 in response to the rotation of the rotor 5.

In FIG. 6, a rotor 5 is fixed on the inside wall of the cylindrical hollow member 2 to face with the stator 3. The rotor 5 is composed of a multipolar permanent magnetic element. The lead 6 is further provided with a switching means composed of a detector 15 for detecting the magnetic pole of the rotor 5 at a predetermined fixed position, and a pair of semiconductor switches 14, 14 depending on the detector 15. This switching means is intended to convert the current direction flowing through the stator lead member 4' in response to the rotation of the rotor 5. The detector 15 is fixed on the support shaft 1 as an example to face with the rotor 5. Though the detector 15 is composed of a Hall element to directly detect the magnetic pole, an optical detecting element may be used with a reflector or the like, not shown, set on the rotor 5 so that the magnetic pole can be indirectly detected. The rotor 5 may be composed of an electromagnetic multipolar magnetic element provided with a coil shape lead member. In this case, the lead is provided with a rotor lead means composed of an annular slip ring and a brush to always keep the current flowing through the coil shape lead member in the same direction.

In the roller drive units shown in FIG. 5 and FIG. 6, as direct current is applied to these unit through the lead 6, the current flowing through the stator lead member 4' and the magnetic field of the rotor 5 generate force according to Fleming's left hand rule and the force is applied to the stator 3. The stator 3 is fixed on the support shaft 1 and thus the counter-force is applied to the rotor 5. The cylindrical hollow member 2 fixedly provided with the rotor 5 is rotated about the support shaft 1.

As explained above, the web feed roller and its drive mechanism according to the present invention can be finely controlled in response to various web feeding conditions such as tension applied to running web, running speed of the web, and the like. Accordingly, the web feed roller can be smoothly and easily applied to an extraordinarily high speed printing system and a large scale printing apparatus that includes many large rotary presses and a long web travelling line with a remarkably stable state can be achieved. Since the feed roller drive unit is integrally assembled in the web feed roller, the web feed roller can be set in a complicated section where many web guide rollers are gathered. Conventional web feed rollers can not be set at such a complicated section because their drive systems are not compact.

Each of the web feed rollers of the present invention can be independently and quickly controlled in response to the running condition of paper web, and the web feed roller itself functions as a driving component of the web feed roller drive unit. Therefore, the web feed roller according to the present invention, ensures improvement in the working efficiency of the printing system.

As many apparently widely different embodiments of this invention may be made without departing from the spirit and scope thereof, it is to be understood that the invention is not limited to the specific embodiments thereof except as defined in the appended claims.

What is claimed is:

1. A rotary press comprising:

drive rollers for driving a web through said rotary press;

a printing section;

a main drive speed control means for controlling a speed of the drive rollers;

a series of web feed rollers adapted to guide the web through said rotary press;

an electric motor connected to and housed within each of said web feed rollers;

speed control means for controlling the speeds of said web feed rollers by controlling the driving speeds of the respective electric motors, said speed control means comprising signal generating means, connected to said main drive speed control means and responsive to a control signal from said main drive speed control means, for controlling the speeds of said web feed rollers to coincide with the speed of the drive rollers, and a dirt detecting unit which detects at least one of dust and ink on a surface of said web feed rollers and generates a dirt detecting signal indicative of the detection of said at least one of dust and ink on the surface of said web feed rollers such that at times when said dirt detecting unit generates said dirt detecting signal said speed control means receives said dirt detecting signal and alters the speeds of said web feed rollers to differ from said drive rollers thereby generating slipping between the web and the web feed rollers.

2. The rotary press of claim 1, wherein said speed control means further comprises a manually actuated control means for sequentially inputting control signals to said electric motors to automatically and successively change the rotating speed of said series of web feed rollers.

3. A rotary press comprising:

drive rollers for driving a web through said rotary press;

a printing section;

a main drive speed control means for controlling a speed of the drive rollers;

a series of web feed rollers adapted to guide the web through said rotary press;

an electric motor connected to each of said web feed rollers;

speed control means for controlling the speeds of said web feed rollers by controlling the driving speeds of the respective electric motors, said speed control means comprising signal generating means, connected to said main drive speed control means and responsive to a control signal from said main drive speed control means, for controlling the speeds of said web feed rollers to coincide with the speed of the drive rollers, and a dirt detecting unit which detects at least one of dust and ink on a surface of said web feed rollers and generates a dirt detecting signal indicative of the detection of said at least one of dust and ink on the surface of said web feed rollers such that at times when said dirt detecting unit generates said dirt detecting signal said speed control means receives said dirt detecting signal and alters the speeds of said web feed rollers to differ from said drive rollers thereby generating slipping between the web and the web feed rollers;

wherein said speed control means further comprises detecting means for detecting a tension force of said web and for altering the speeds of said web feed rollers when the detected tension force is outside of a predetermined range.

4. A rotary press comprising:

drive rollers for driving a web through said rotary press;

a printing section;

a main drive speed control means for controlling a speed of the drive rollers;

a series of web feed rollers adapted to guide the web through said rotary press;

an electric motor connected to and housed within each of said web feed rollers;

speed control means for controlling the speeds of said web feed rollers by controlling the driving speeds of the respective electric motors, said speed control means comprising signal generating means, connected to said main drive speed control means and responsive to a control signal from said main drive speed control means, for controlling the speeds of said web feed rollers to coincide with the speed of the drive rollers; and a dirt detecting unit which detects at least one of dust and ink on a surface of said web feed rollers and generates a dirt detecting signal indicative of the detection of said at least one of dust and ink on the surface of said web feed rollers such that at times when said dirt detecting unit generates said dirt detecting signal said speed control means receives said dirt detecting signal and alters the speeds of said web feed rollers to differ from said drive rollers thereby generating slipping between the web and the web feed rollers;

wherein said web feed rollers are only driven in a travelling direction of the web through the rotary press.

* * * * *